Dec. 17, 1929.  J. B. FISHER  1,739,716
VEHICLE TRAILER
Filed Oct. 27, 1927  2 Sheets-Sheet 1
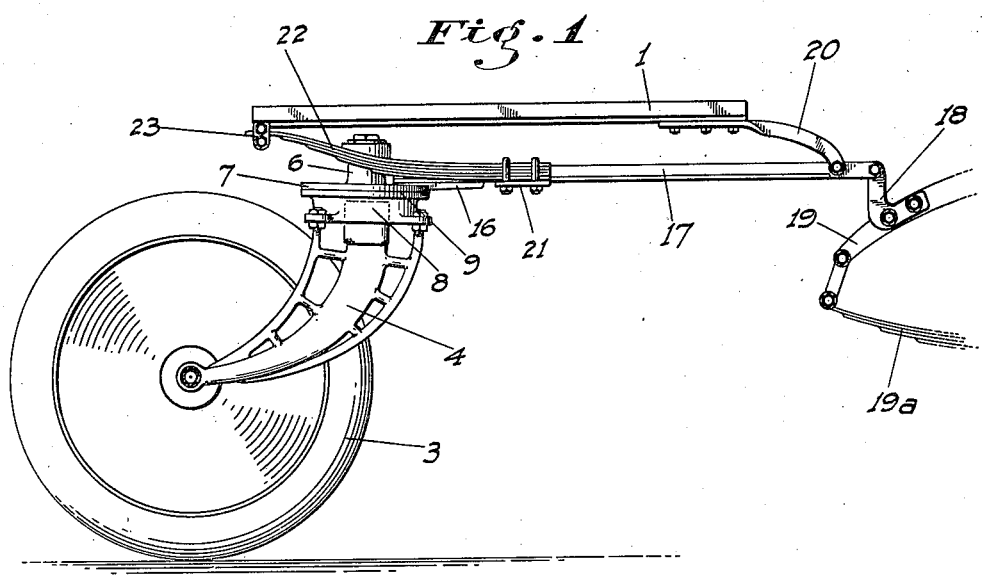
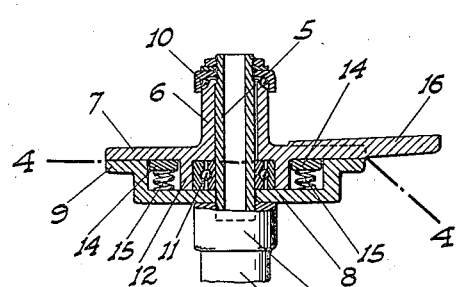
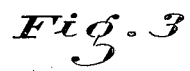
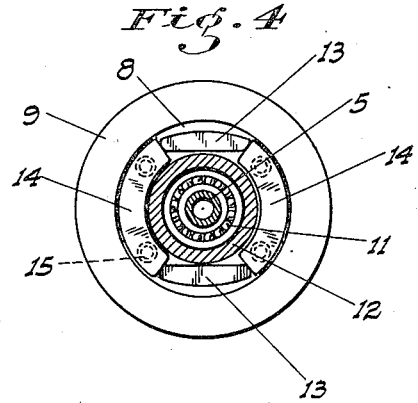
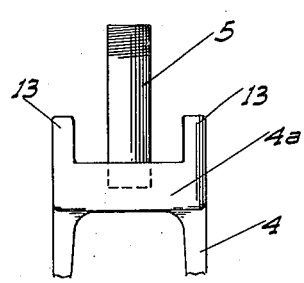
INVENTOR
J. B. Fisher
BY
ATTORNEY Dec. 17, 1929.     J. B. FISHER     1,739,716
VEHICLE TRAILER
Filed Oct. 27, 1927     2 Sheets-Sheet 2
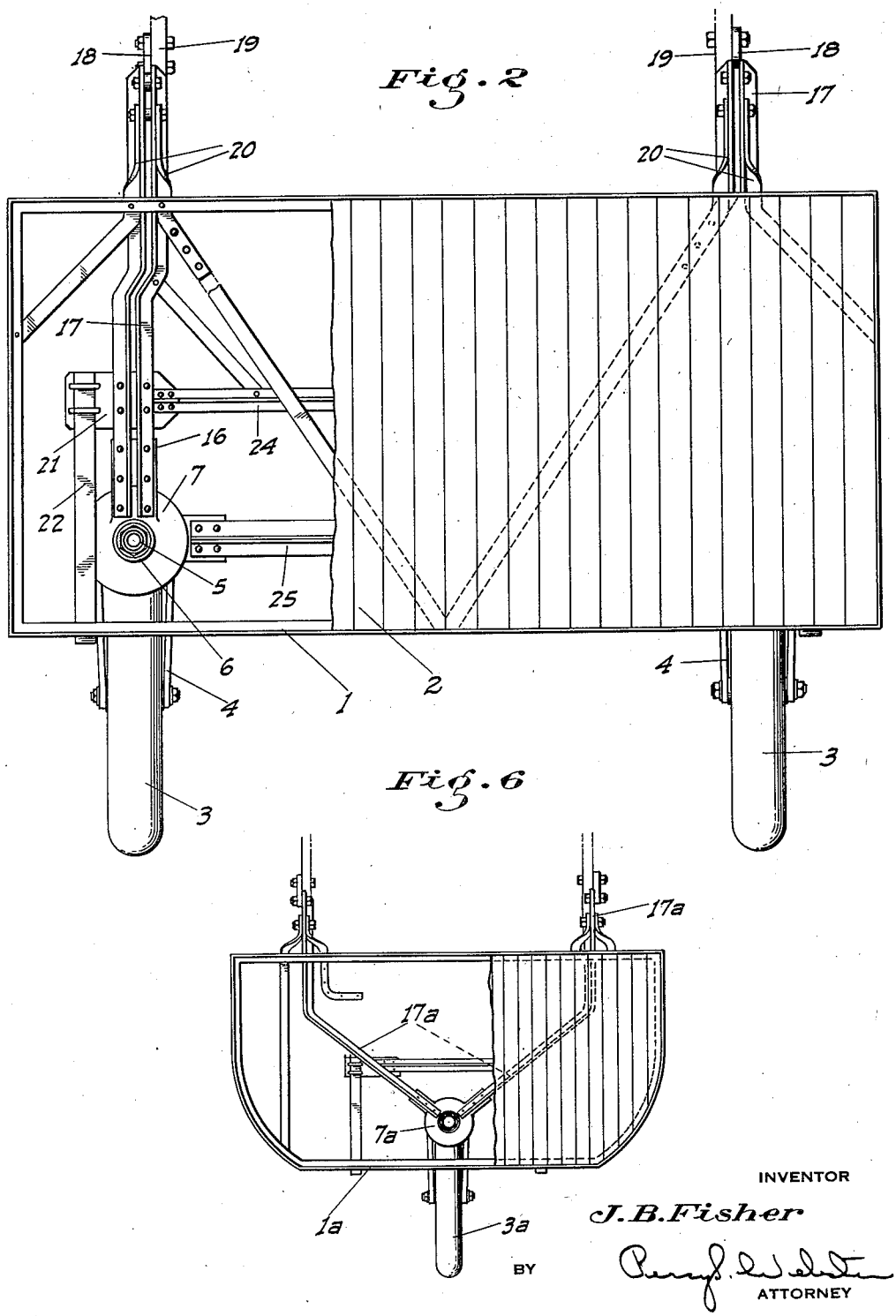
INVENTOR
J. B. Fisher
BY
ATTORNEY Patented Dec. 17, 1929

1,739,716

UNITED STATES PATENT OFFICE

JOSEPH B. FISHER, OF STRATHMORE, CALIFORNIA

VEHICLE TRAILER

Application filed October 27, 1927. Serial No. 229,033.

This invention relates to improvements in trailers to be drawn by motor vehicles; my principal objects being to provide a trailer having a draft means so arranged that the trailer may be kept very close to the vehicle without interfering with the turning of corners, no matter how sharp; and to provide supporting wheels for the trailer so mounted as to enable the trailer to be backed up as easily as it can be drawn ahead.

In these respects my trailer, I believe, forms a radical improvement from ordinary trailers whose construction is such that they cannot be backed up with any accuracy of direction, if at all, and which much be disposed a considerable distance behind the hauling vehicle in order to enable such vehicle and the trailer to turn corners without interference with each other. This latter feature is very objectionable since it necessitates the complete outfit having a considerable and awkward length, rendering the outfit hard to handle, especially in congested traffic.

My improved trailer may, however, be used in connection with a vehicle which it is desired to park laterally in close quarters, as in a shopping district, without the trailer projecting into the street an objectionable distance if the car is parked at an angle; or requiring a very long space if parked along the curb. Also, no inconvenience is had in backing up or otherwise manipulating the car during or subsequent to parking operations.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved trailer.

Fig. 2 is a top plan view of the trailer with the floor partly broken out to show the construction underneath.

Fig. 3 is a sectional elevation of a special form of wheel-fork bearing.

Fig. 4 is a sectional plan of the bearing taken on the line 4—4 of Fig. 3.

Fig. 5 is a fragmentary front elevation of the wheel-fork.

Fig. 6 is a top plan view of the trailer having a modified wheel arrangement.

Referring to the numerals of reference on the drawings and particularly at present to the structure shown in Figures 1–5, the bed of the trailer comprises a rectangular frame 1, of angle or similar structural iron, which supports the floor 2 of suitably laid planking. A body of any desired character may be erected on this bed which, however, forms no part of this invention.

Disposed under the bed toward the rear and sides of the same are transversely spaced wheels 3. Each wheel is mounted in a rearwardly projecting fork 4, whose upper cross bar 4—a has a centrally disposed spindle 5 projecting upwardly therefrom. This spindle turns in a sleeve 6 formed with and above a disk 7, said disk co-operating with a cup member 8 seated on the fork bar 4—a centrally of the spindle. This cup is provided with an upper annular flank 9 which rides against the adjacent face of the disk 7. An annular ball-bearing 10 is placed between the spindle and the sleeve at the top and another similar ball bearing 11 lies between the spindle and a skirt 12 which depends from the disk 7 into the cup 8 in spaced relation to the sides thereof.

To prevent too easy turning of the fork and cup relative to the upper disk, I provide the following arrangement: Extending upwardly from the fork in transversely opposed relation are extensions 13, which project through the bottom of the cup into the space between the sides thereof and skirt 12. Disposed in said space on each side of and abutting against the edges of the fork extensions are floating segmental rings 14, which are constantly pressed against the under space of the upper disk 7 by springs 15. It will therefore be seen that when the fork and cup turn, these rings will be forced to turn therewith and said rings having frictional engagement with the upper disk they will yieldably resist such turning movement. This arrangement therefore prevents the wheel and fork from wobbling.

The upper disk is formed with forwardly projecting pads 16 on which are rigidly secured the rear ends of draft beams 17, which extend forwardly under the bed of the trailer to a point a short distance in front of the bed. At their forward ends said beams are pivoted on to brackets 18 which are adapted to be secured to any suitable members in the rear end of a motor vehicle, such as the rear ends of the main frames 19 of the vehicle. Adjacent to the forward ends of the beams, links 20 are pivoted thereon, which links extend rearwardly and upwardly to rigid connections with the trailer bed frame which is adjacent to the forward end thereof.

Secured to the beams 17 a short distance ahead of the pads 16 are transversely projecting plates 21 which form supports for the forward ends of quarter elliptic springs 22, of common character, whose rear ends are flexibly connected to the rear end of the frame 1 by suitable means such as shackles 23. The plates 21 are connected together so as to brace the beams 17 against lateral deflection by a cross beam 24. A similar beam 25 connects the two upper disks 7.

It will therefore be seen that the trailer, connected as it is to the car by the pair of transversely spaced draft beams, cannot swing to one side or the other of the car and is held in rigid longitudinal alignment therewith. The wheels 3 being turnably mounted on the trailer, however, enables the trailer to readily turn corners with the vehicle and allow the same to be backed up; the wheels then reversing themselves in position relative to the trailer bed as will be evident.

The pull is taken from the beams 17 by the links 20 and also by the springs 22, which parts are connected to opposite ends of the trailer bed. The pivotal connection of the links with the draft beams permits the rear end of the trailer frame to develop downwardly as the springs flatten, giving such rear end the desired cushion movement; a similar movement being imparted to the front end of the trailer by reason of the rear springs 19—a of the vehicle to which the trailer is attached.

The spindle 5 is set so that it has a slight forward slant towards its upper end when the wheels are disposed in their normal trailing positions. This arrangement tends to cause the wheels to maintain themselves in proper tracking relationship with the trailer and car, without any tendency for them to wobble sideways.

This construction also allows the wheels, when reversed, to clear the bed of the trailer so that the bed may be set so as to normally lie at a lower level than would otherwise be possible.

In the type of trailer shown in Fig. 6, the trailer bed frame 1—a is supported on a single centrally located wheel 3—a, the upper disk 7—a of whose swivel supporting structure is connected to both draft beans 17—a. These beams then diverge toward the front end of the trailer at which end they are the same distance apart as the beams 17 of the first described type. Otherwise the construction and operation of the two types of trailer are substantially the same.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A trailer including a bed structure, a wheel thereunder, supporting means for the wheel, a draft beam connected to said supporting means and extending forwardly thence under the bed, a spring connected to the beam and to the bed adjacent one end of the latter, and a link secured to the bed at the other end thereof and pivoted onto the beam adjacent said other end of the bed.

2. A trailer including a bed structure, a wheel thereunder, supporting means for the wheel, a draft beam connected to said supporting means and extending forwardly thence under the bed, a substantially horizontal spring secured at one end to the beam adjacent its rear end and extending thence to a connection with the rear end of the bed, and a link pivoted onto the beam adjacent its forward end and secured to the forward end of the bed.

3. A trailer including a wheel, a supporting member therefor including a vertical spindle, a support in which the spindle is turnable, a draft beam directly connected to and extending forwardly from the spindle support, a bed structure above the beam, a quarter-elliptic spring connected at its rear end to the bed, means for connecting the forward end of the spring to the beam adjacent the spindle support, and a rigid link between the front end of the bed and the beam adjacent its forward end and pivoted onto said beam.

4. A trailer including a horizontal draft beam, a wheel under the rear end of the same, a supporting member for the wheel including an upstanding spindle, and a support in which said spindle is turnable, rigidly connected to said beam; said support being so disposed that the spindle will normally set at an acute forward angle relative to the upper face of the beam and the supporting member being arranged so that the spindle is substantially adjacent the normally forward edge of the wheel whereby the diameter of said wheel may be greater than the normal distance from the ground to the under side of the beam while still permitting the wheel to pass under the same when the spindle turns through a half revolution from its normal position.

In testimony whereof I affix my signature.

JOSEPH B. FISHER.